United States Patent
Rohner et al.

(10) Patent No.: US 10,054,467 B2
(45) Date of Patent: Aug. 21, 2018

(54) ABSOLUTE CAPACITIVE ROTARY ENCODER

(71) Applicant: HEXAGON TECHNOLOGY CENTER GMBH, Heerbrugg (CH)

(72) Inventors: Marcel Rohner, Heiden (CH); Ingo Bednarek, Heerbrugg (CH); Lukas Baumann, St. Gallen (CH); Rainer Wohlgenannt, Klaus (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 40 days.

(21) Appl. No.: 14/958,836

(22) Filed: Dec. 3, 2015

(65) Prior Publication Data

US 2016/0161291 A1 Jun. 9, 2016

(30) Foreign Application Priority Data

Dec. 4, 2014 (EP) .................................. 14196332

(51) Int. Cl.
*G01R 27/26* (2006.01)
*G01D 5/241* (2006.01)

(52) U.S. Cl.
CPC ................................ *G01D 5/2415* (2013.01)

(58) Field of Classification Search
CPC ..... G01R 27/2605; G01R 15/16; G06F 3/044; G06F 2203/04103; G06F 3/0416
USPC ................. 324/679, 658, 686, 661
See application file for complete search history.

(56) References Cited

U.S. PATENT DOCUMENTS

| | | | |
|---|---|---|---|
| 3,766,544 A | 10/1973 | Batz | |
| 4,839,646 A | 6/1989 | Tyson | |
| 4,843,387 A | 6/1989 | Arai et al. | |
| 4,851,835 A | 7/1989 | Krumholz et al. | |
| 6,054,851 A | 4/2000 | Masreliez et al. | |
| 6,892,590 B1 | 5/2005 | Andermo | |
| 6,940,278 B2 | 9/2005 | Pettersson et al. | |
| 2004/0210801 A1* | 10/2004 | Prasad | G11C 27/024 714/700 |

(Continued)

FOREIGN PATENT DOCUMENTS

| | | |
|---|---|---|
| CN | 87 1 02580 A | 12/1987 |
| CN | 87 1 06077 A | 6/1988 |

(Continued)

OTHER PUBLICATIONS

European Search Report dated Jun. 2, 2016 in application No. PCT/EP2013/068366.

(Continued)

*Primary Examiner* — Giovanni Astacio-Oquendo
(74) *Attorney, Agent, or Firm* — Maschoff Brennan

(57) ABSTRACT

Some embodiments of the invention include an absolute capacitive rotary encoder comprising a first disk, which is rotatable relative a second disk, and a first sensor ring and a second sensor ring. The first and the second sensor ring each have a multiplicity of first coupling electrodes and second coupling electrodes capacitively coupling to one another. The first coupling electrodes of a respective sensor ring have different coupling signal phases. The first sensor ring and the second sensor ring are matched to one another in such a way that an angle is determinable absolutely.

21 Claims, 6 Drawing Sheets

(56) References Cited

U.S. PATENT DOCUMENTS

| | | | | |
|---|---|---|---|---|
| 2004/0212431 A1* | 10/2004 | Butler | ................ | H03F 3/45632 330/261 |
| 2010/0207795 A1* | 8/2010 | Waki | ................ | H03M 1/0658 341/143 |
| 2013/0093439 A1 | 4/2013 | Ulmen et al. | | |
| 2015/0145524 A1* | 5/2015 | Duncan | ................ | G01R 31/024 324/538 |
| 2016/0054370 A1* | 2/2016 | Fomin | ................ | G01R 31/025 324/509 |
| 2016/0178689 A1* | 6/2016 | Okita | ................ | G01R 31/024 324/509 |

FOREIGN PATENT DOCUMENTS

| | | | |
|---|---|---|---|
| CN | 1347493 | A | 5/2002 |
| CN | 1894571 | A | 1/2007 |
| DE | 10 2011 105898 | A1 | 12/2012 |
| EP | 0 270 440 | A1 | 6/1988 |
| EP | 0 248 165 | B1 | 7/1993 |
| GB | 2 118 720 | A | 11/1983 |
| WO | 00/63653 | A2 | 10/2000 |
| WO | 02/21081 | A1 | 3/2002 |
| WO | 03/023329 | A1 | 3/2003 |
| WO | 2007/043962 | A1 | 4/2007 |

OTHER PUBLICATIONS

European Search Report dated Mar. 12, 2018 as received in Application No. 16202380.8.

* cited by examiner

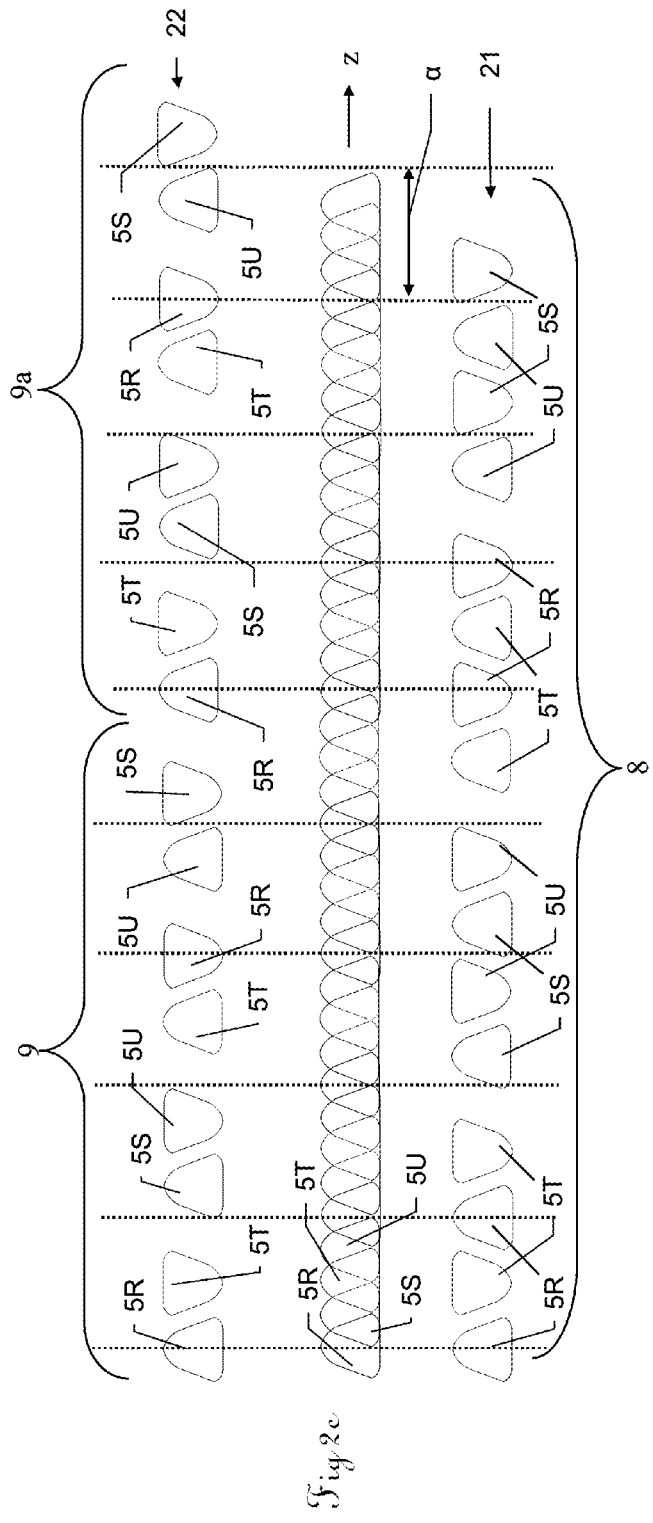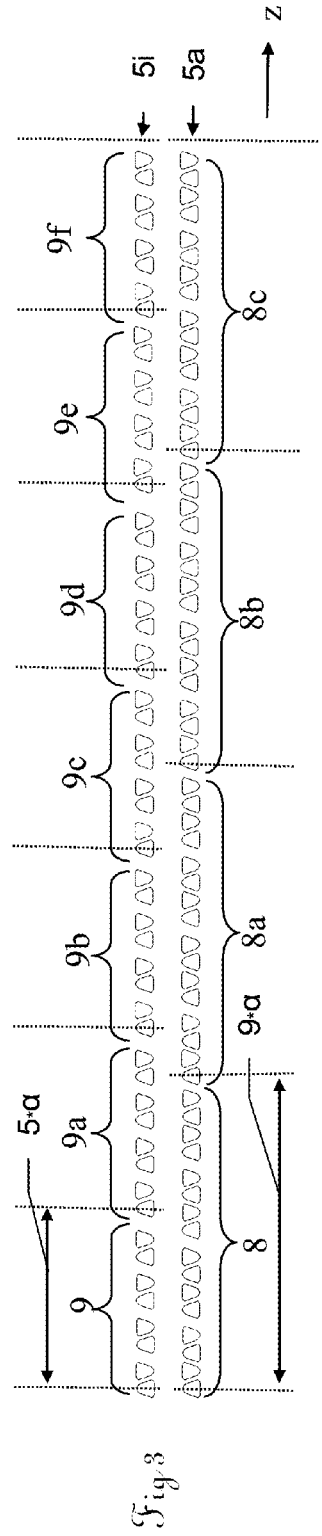

| sector | ADC 1 | | | | ADC 2 | | | |
|---|---|---|---|---|---|---|---|---|
| | 13a | 13b | 13c | 13d | 13a | 13b | 13c | 13d |
| S1 | n | n | n | n | p | p | p | p |
| S2 | p | p | p | p | n | n | n | n |
| S3 | n | n | p | p | p | p | n | n |
| S4 | p | p | n | n | n | n | p | p |
| S5 | n | p | p | n | p | n | n | p |
| S6 | p | n | n | p | n | p | p | n |

ABSOLUTE CAPACITIVE ROTARY ENCODER

FIELD OF THE INVENTION

The invention relates to an absolute capacitive rotary encoder, a method for determining angles using same rotary encoder and same computer program product.

BACKGROUND

Rotary encoders have been known for many years in very different embodiments. They are used not only in mechanical and plant engineering, but also in very different measurement instruments, for example in geodetic instruments, coordinate measuring machines or robots. The problem addressed in the application thereof lies in determining the positional angle or corresponding variables derived therefrom, such as speed or acceleration, between two mutually rotatable subsystems.

By way of example, such angle measuring systems are used in coordinate measuring machines, such as e.g. articulated arms, for establishing the angular positions in the individual joints, from which the spatial position of a sensing element attached at the end of the arm is subsequently calculated.

Such angle measuring systems are also installed in geodetic measuring instruments, such as e.g. theodolites or total stations, by means of which very different surveying problems, such as e.g. the determination of horizontal and vertical angles, are carried out.

Moreover, such rotary encoders can also be found in installations and machines for registering the positions of machine components such as drives, swivel heads, butterfly valves, rotary tables and the like. The positions registered in the process can be used as positional values for measuring purposes, or else for positioning components by way of a drive with a position control loop.

A rotary encoder has two units, for example a stator disk and a rotor disk, that are movable relative to one another along one degree of freedom about a measuring axis. The first unit is wholly or partly scanned by means of a scanning signal from a scanning unit attached at the second unit, with information about the angular position of the two units relative to one another being obtained. In principle, different physical operating principles, such as e.g. optical or capacitive scanning, are suitable for the scanning process. Here, capacitive rotary encoders have the advantage of a lower power consumption and a more cost-effective design over comparable optical rotary encoders.

Incremental and absolute rotary encoders are known. A disadvantage of systems with incremental determination of angles is that a zero or reference position must be assumed again after every restart of the angle measuring system. By contrast, absolute rotary encoders generate clearly differentiable scanning signals for each relative position of the subsystems rotatable in relation to one another. As a result, a respective relative position can be associated directly, i.e. without approaching a reference or initial position, with a unique angle.

In practice, there are deviations from an ideal location or ideal alignment of the two subsystems or units of the rotary encoder rotatable against one another due to manufacturing tolerances, installation tolerances or aging phenomena, which deviations cause errors when determining the rotary angle without corresponding compensation measures. By way of example, such deviations are eccentricities of the rotor disk and/or stator disk, deformations or tilts, which e.g. lead to irregular profile of the axial distance between the disks, or inaccuracies in the position code. In the case of capacitive rotary encoders, this leads, inter alia, to measurement errors due to inadvertent changes in the capacitive coupling between stator disk and rotor disk. In addition to the aforementioned sources of error, further sources of error include e.g. non-ideal scanning signals, signal crosstalk or external interference signals. Such measurement errors and the adverse effects on the measurement accuracy accompanying this are a reason why, despite the aforementioned higher power consumption and production costs, optical rotary encoders are in practice preferred over capacitive rotary encoders for machines or measurement instruments in which angles are to be determined with a high precision.

U.S. Pat. No. 6,940,278 B2 discloses a capacitive rotary encoder comprising a stator unit with emitter electrodes and a rotor disk with receiver electrodes arranged in a circular manner. The emitter electrodes are actuated using AC voltage with different phases, and so the AC voltage signals are transmitted to receiver electrodes as a function of the relative angle position of the stator unit in relation to the rotor disk by the capacitive coupling, as a result of which the positional angle is determinable from the signals received by the receiver electrodes. An absolute determination of the angle is made possible in some embodiments. To this end, the rotary encoder has an additional capacitive unit made of electrodes coupled with one another in a capacitive manner. These electrodes are arranged, or actuated with AC voltage, in such a way that the angle is roughly determinable in a unique manner within the full circle, as a result of which the incremental measurement value with a high resolution can be located absolutely. For the purposes of compensating errors caused by manufacturing, such as eccentricities, tilts or errors in the electrode geometries, use is made, according to the U.S. Pat. No. 6,940,278 B2, of a differential geometric compensation with the goal of such errors mutually canceling out by measurement signals with a different sign. To this end, the rotary encoder for example has a further stator unit, which is offset by 180° in relation to the other stator unit, or the stator unit is extended to form a stator disk which covers a whole circle of 360°. A disadvantage of the rotary encoder according to the U.S. Pat. No. 6,940,278 B2 is that the compensation of the aforementioned errors is only insufficient for high demands on precision in respect of determining the angle. Moreover, a further disadvantage is that further sources of errors which, as a matter of principle, are not compensatable by differential compensation, such as a deformation of the stator or rotor disks, are not taken into account; expressed differently, only a small part of the error spectrum is compensated for.

SUMMARY

Some embodiments of the present invention include providing an improved absolute capacitive rotary encoder.

Some embodiments of the present invention include providing an absolute capacitive rotary encoder with improved error self compensation.

Some embodiments of the present invention include providing an absolute capacitive rotary encoder which compensates both low-frequency and relatively high and high-frequency components of the error spectrum.

Some embodiments of the present invention include providing a method for determining angles for such a rotary encoder.

The present invention relates to an absolute capacitive rotary encoder. The rotary encoder has a first disk, e.g. a stator disk, and a second disk, e.g. a rotor disk, as two units movable relative to one another about one measuring axis with one degree of freedom. The rotary encoder furthermore comprises a first sensor ring with a multiplicity of first coupling electrodes, more particularly emitter electrodes, arranged in a circular shape on the first disk and aligned radially, and a multiplicity of second coupling electrodes, more particularly receiver electrodes, arranged in a circular shape on the second disk and aligned radially. According to the invention, in addition to the first sensor ring, the rotary encoder comprises at least one second sensor ring likewise with, like the first sensor ring, a multiplicity of first coupling electrodes, more particularly emitter electrodes, arranged in a circular shape on the first disk and aligned radially, and a multiplicity of second coupling electrodes, more particularly receiver electrodes, arranged in a circular shape on the second disk and aligned radially. The circular widths of the first and second coupling electrodes of each sensor ring are matched to one another, wherein the circular width of the emitter electrodes or the receiver electrodes is understood to mean the maximum or mean extent in the circular direction.

The first disk and the second disk are arranged coaxially on a measuring axis and at a distance from one another and rotatable relative to one another about the measuring axis, wherein the distance between the first disk and the second disk is dimensioned in such a way that time-varying coupling signals are transmittable between the first and second coupling electrodes of a respective sensor ring by way of capacitive coupling. For a differential signal evaluation of the coupling signals transmitted between the first and second coupling electrodes, the second coupling electrodes are preferably subdivided into two mutually reciprocal types, i.e. every second coupling electrode carries e.g. positive, or inversely thereto, negative coupling signals. Here, the second coupling electrodes, respectively spaced apart by one, of each sensor ring are of the same type, i.e. the second coupling electrodes of a respective sensor ring directly adjacent to one another in the circular direction are the reciprocal of one another.

The first coupling electrodes of a respective sensor ring have at least three defined different coupling signal phases. Here, the coupling signal phases are incorporated on part of the signal, by virtue of coupling signals with different phases being used, or by means of the embodiment or geometry of the first coupling electrodes. The coupling signal phases are offset from one another, with the offset of the coupling signal phases from one another preferably being 90° or a quarter of the phase length when using four phases.

An alpha-interval is defined on the basis of the number of coupling signal phases. A structure of the first coupling electrodes is predetermined on each sensor ring by the alpha-intervals. Each sensor ring has a number of alpha-intervals along the sensor ring such that the first sensor ring has a first alpha-interval overall number as the number of all alpha-intervals along the first sensor ring and the second sensor ring has a second alpha-interval overall number as the number of all alpha-intervals along the second sensor ring, with the first and second alpha-interval overall numbers respectively being greater than one.

In order to render possible a unique, i.e. absolute, determination of angles on the basis of the two sensor rings over the whole measuring region, e.g. the full circle, of the rotary encoder, the first alpha-interval overall number and the second alpha-interval overall number are co-prime. Thus, each sensor ring has a multiplicity of first coupling electrodes, the arrangement of which is structured along the respective sensor ring in accordance with the alpha-intervals, wherein a sequence of the first coupling electrodes, structured thus, repeats along the respective sensor ring such that, on its own, an individual sensor ring is only suitable for an ambiguous, incremental angle determination. However, according to the invention, such ambiguity is lifted by the combination of the sensor rings matched to one another in respect of the alpha-interval overall numbers. Consequently, an angle is absolutely determinable from the signal evaluation of the coupling signals, transmitted between the first and second coupling electrodes, of both sensor rings such that the present invention provides an absolute capacitive rotary encoder.

The sequence of the first coupling electrodes along the first sensor ring is defined by a first phase permutation such that respectively a row of circularly adjacent first coupling electrodes of the first sensor ring forms a first phase permutation interval, referred to briefly as P-interval below, and the first sensor ring has a number M1 of same first P-intervals. The same applies analogously to the second sensor ring: the sequence of the first coupling electrodes thereof along the second sensor ring is defined by a second phase permutation such that respectively a row of circularly adjacent second coupling electrodes forms a second P-interval and the second sensor ring has a number M2 of same second P-intervals. Depending on the embodiment, the numbers M1 and M2 typically lie in the single-digit to two-digit range. Here, like in the prior art, e.g. U.S. Pat. No. 6,940,278 B2, a phase permutation is understood to mean the principle that the sequence of the first coupling electrodes is such that, compared to the simplest possibility of the phase sequence, in which the respective circularly directly adjacent first coupling electrode has the respectively directly next coupling signal phase, the sequence of coupling signal phases is modified over a certain portion, which corresponds to a P-interval, while maintaining an equal distribution of the coupling signal phases over the whole coupling electrode row. Such a row, also known as P-interval, is continuously repeated along the sensor ring, as a result of which all first coupling electrodes of a sensor ring are arranged in a number of P-intervals. Preferably, a respective sensor ring in this case has four phases offset from one another. The number of second coupling electrodes of the same type per sensor ring is optionally matched to the number of P-intervals; to be precise, the number of second coupling electrodes of the same type is a multiple, in the mathematical sense, of the number M1 of first P-intervals or a multiple of the number M2 of second P-intervals. Preferably, the number of second coupling electrodes of the same type per sensor ring equals the overall number of alpha-intervals of the respective sensor ring.

In a development of the rotary encoder according to the invention, the coupling signals of the second coupling electrodes per type of a sector are brought together sector-by-sector, as a result of which the first and/or second sensor ring is subdivided into at least three sectors, e.g. four sectors (quadrants) or eight sectors, in relation to the coupling signals. The sectors are distributed over the whole sensor ring, i.e. the relevant sensor ring is completely subdivided into sectors in relation to the coupling signals. The coupling signals are evaluated by comparing the put together coupling signals from in each case at least two sectors with one another, as a result of which information is establishable about a deviation of the arrangement of the first and/or second disk from an ideal location relative to the measuring axis. Optionally, the sectors are uniformly distributed and have the same size and/or the number thereof is even (i.e. a mathematical multiple of two) and/or the number of alpha-intervals is a multiple of the number of the sectors and/or the number of second coupling electrodes is a multiple of the number of sectors.

In an alternative embodiment, the absolute capacitive rotary encoder according to the invention has a first disk, e.g. a stator disk, and a second disk, e.g. a rotor disk, as two units movable relative to one another about one measuring axis with one degree of freedom and a first and second sensor ring, respectively with a multiplicity of first coupling electrodes, more particularly emitter electrodes, arranged in a circular shape on the first disk and aligned radially, and a multiplicity of second coupling electrodes, more particularly receiver electrodes, arranged in a circular shape on the second disk and aligned radially. The circular widths of the first and second coupling electrodes of each sensor ring are matched to one another. The first disk and the second disk are arranged coaxially on a measuring axis and at a distance from one another and rotatable relative to one another about the measuring axis, wherein the distance between the first disk and the second disk is dimensioned in such a way that time-varying coupling signals are transmittable between the first and second coupling electrodes of a respective sensor ring by way of capacitive coupling. An absolute angle is determinable by evaluating the coupling signals of the first and of the second sensor ring, i.e. of both sensor rings, transmitted between the first and second coupling electrodes. For a differential signal evaluation of the coupling signals transmitted between the first and second coupling electrodes, the second coupling electrodes are subdivided into two reciprocal types, i.e., for example, each second coupling electrode is connected directly or indirectly to the positive or negative input of an analog-to-digital converter (ADC). Here, the second coupling electrodes, respectively spaced apart by one, of a respective sensor ring are of the same type.

In the aforementioned alternative embodiment, the first coupling electrodes of a respective sensor ring have at least three defined different coupling signal phases. Here, the coupling signal phases are incorporated on part of the signal or by means of the embodiment or geometry of the first coupling electrodes and offset from one another, with the offset of the coupling signal phases from one another preferably being 90° or a quarter when using four phases. An alpha-interval is defined on the basis of the number of coupling signal phases. A structure of the first coupling electrodes is predetermined on each sensor ring by the alpha-intervals. Each sensor ring has a number of alpha-intervals (along the sensor ring) such that the first sensor ring has a first alpha-interval overall number and the second sensor ring has a second alpha-interval overall number. Here, the first or the second alpha-interval overall numbers may be greater than one, i.e. one of the two sensor rings can have only one alpha-interval. Thus, each sensor ring has a multiplicity of first coupling electrodes, the arrangement of which is structured along the respective sensor ring in accordance with the alpha-intervals such that an angle is determinable absolutely on the basis of the evaluation of the coupling signals of both sensor rings. The coupling signals of the second coupling electrodes are per type of a sector brought together sector-by-sector, as a result of which the first and/or second sensor ring is subdivided into at least three sectors, e.g. four sectors (quadrants) or eight sectors, in relation to the coupling signals. The sectors are distributed over the whole sensor ring, i.e. the relevant sensor ring is completely subdivided into sectors in relation to the coupling signals. The coupling signals are evaluated by comparing the put together coupling signals from in each case at least two sectors with one another, as a result of which information is establishable about a deviation of the arrangement of the first and/or second disk from an ideal location relative to the measuring axis. Optionally, the sectors are uniformly distributed and have the same size, the number thereof is even (i.e. a mathematical multiple of two) and/or the number of second coupling electrodes is a multiple of the number of sectors.

As an alternative to the sector-by-sector bringing together of coupling signals in the case of at least three sectors, the relevant sensor ring has at least three types of first coupling electrodes in all embodiments, which first electrodes respectively have at least three mutually offset coupling signal phases, such that, overall, at least nine different coupling signal phases are used, wherein respectively three phases are connected by respectively one type of first coupling electrodes.

In one development of a rotary encoder according to the invention, errors which are caused by the deviation of the arrangement of the first and/or second disk from an ideal location relative to the measuring axis are compensatable by means of the information, established by comparing the brought together coupling signals, about a deviation of the arrangement of the first and/or second disk from an ideal location relative to the measuring axis. In particular, such errors are low frequency errors, in particular such errors which are periodic in relation to a rotation through 360°. Within the meaning of the present invention, "compensate" is to be understood as a complete or partial compensation. Alternatively or additionally, the deviation of the arrangement of the first and/or second disk from an ideal location relative to the measuring axis is determinable by means of the information about a deviation of the arrangement of the first and/or second disk from an ideal location relative to the measuring axis.

In all embodiments, the first and second sensor ring are optionally matched to one another by means of the sequence of the first coupling electrodes of the first sensor ring and the sequence of the first coupling electrodes of the second sensor ring such that weaknesses of the two sensor rings at least partly compensate one another. Thus, by designing the respective sequence of the first coupling electrodes, the error spectra of the first and second sensor ring are influenced in a targeted manner in such a way that, at least in portions, spectral components which occur more strongly in one sensor ring are relatively weak or (approximately) equal to zero in the other sensor ring.

Hence, as a result of the mutually matched sensor rings, comparatively strongly error-afflicted components of the error spectrum of the first sensor ring are compensatable by the comparatively weakly error-afflicted corresponding components of the second sensor, and vice versa. Depending on the embodiment or matching of the sensor rings, portions of the error spectrum of the second sensor ring are compensated and/or vice versa by way of signal evaluation of the coupling signals of the first sensor ring, wherein, predominantly relatively high-frequency and/or high-frequency portions of the error spectra are mutually compensated. For compensating the main lines of the respective error spectra, the first alpha-interval overall number of the first sensor ring and the second alpha-interval overall number of the second sensor ring are optionally unequal and, moreover, all multiples of the first alpha-interval overall number are unequal to all multiples of the second alpha-interval overall number. As a further option, certain or occurring secondary lines of the error spectra are likewise mutually compensated. Furthermore, the matching is optionally brought about in such a way that the error spectrum of the first sensor ring is orthogonal to the error spectrum of the second sensor ring. Accordingly, what emerges by combining two or more sensor rings which, as described above, are matched to one another is, according to the invention, a rotary encoder with an (overall) error spectrum with self-compensating error components.

The present invention is not restricted to embodiments with two sensor rings, but rather rotary encoders according to the invention optionally have three or more sensor rings, wherein at least two of the sensor rings differ from one another in such a way that angles are determinable absolutely on the basis of the signal evaluation of the sensor rings. To this end, the sensor rings preferably have such a different design that there is no number which divides the alpha-interval overall numbers of all sensor rings. Here, the sensor rings can have pairwise common divisors. The sequences of the respective first coupling electrodes are matched to one another in such a way that the weaknesses in the error spectra of the individual sensor rings reciprocally compensate one another, e.g. by virtue of each error spectral line in at least one error spectrum of the sensor rings having a weakly embodied amplitude or, in the ideal case, an amplitude equal to zero. Here, a sector-by-sector bringing together of coupling signals is brought about in at least one of the sensor rings, advantageously in the sensor ring with the highest resolution, for example as a result of the highest number of coupling electrodes, which generally is the outermost sensor ring. If the sector-by-sector bringing together of coupling signals is brought about in the case of a plurality of sensor rings, it is often advantageous in view of the error compensation if the subdivision into sectors is such that the sectors of a respective sensor ring differ from those of a different sensor ring, e.g. in view of the number or angular size thereof, and/or or are offset in relation to one another.

The coupling signals of the second coupling electrodes are directly applied or picked up at the first and second disk by electrical contacts. As an alternative, preferred thereover, the second disk has transmission electrodes for the first and second sensor ring, which transmission electrodes capacitively couple with the transmission electrodes of the first disk, as a result of which the coupling signals are transmittable between the first and the second disk. By way of the signal transmission means in the form of transmission electrodes, the coupling signals are transferred from one disk to the other one such that electrical contacts for applying or picking up the coupling signals are only required on one of the two disks. The other disk, preferably the second disk, only has internal electrical contacts, e.g. those between the second coupling electrodes and the transmission electrodes of the respective sensor ring, which is why such a disk is referred to as passive disk below. Compared to the aforementioned "active" disks with contacts for picking up or supplying coupling signals, a passive disk enables the simplification of the production of same and the electrical contacting of the rotary encoder as a whole and thus makes this more cost-effective since, for example, there only needs to be electrical contact to the static, non-rotating disk. A passive second disk has at least one transmission electrode per type of second coupling electrodes per sensor ring, i.e. electrically conductively connected to at least one second coupling electrode of one type. Accordingly, the first disk has at least one transmission electrode per sensor ring per type. Transmission electrodes of the same type and the same sensor ring couple capacitively with one another, for the purposes of which they have the same radial distance from the measuring axis (for example in relation to the center of the transmission electrodes). In the case of the same radial distance, the radial extent (extent in the radial direction) of the transmission electrodes of the first disk is optionally different to the radial extent of the transmission electrodes of the second disk coupling therewith. As a result of this, the robustness in relation to eccentricities of the first and/or second disk is increased, with the extent in the radial direction of the transmission electrodes of the second disk preferably being less than that of the first disk.

The sector-by-sector bringing together of coupling signals is optionally brought about in embodiments with transmission electrodes by virtue of the first disk, in the case of a sensor ring divided into sectors, having, per sector, one transmission electrode per type of second coupling electrode, i.e. two transmission electrodes. The transmission electrodes of the individual sectors are separated from one another. All coupling signals, which are transmitted to this transmission electrode within a sector, are combined by means of such a transmission electrode, the circular extent of which corresponds to the circular extent of the sector. Here, the transmission electrodes of the first or second disk are respectively connected to a single first or second coupling electrode or, in each case, with a sequence of circularly adjacent first or second coupling electrodes of the same type. The circular extent of each such sequence of second coupling electrodes on the second disk need not correspond to the circular extent of a sector. Rather, in view of an optimized coupling signal transmission, it preferably corresponds to the circular extent of a group, in a circular direction, of alpha-intervals lying next to one another of the relevant sensor ring on the first disk, preferably the circular extent of a P-interval.

In the case of embodiments with an active second disk, i.e. without transmission electrodes, the sector-by-sector bringing together of coupling signals is optionally brought about by virtue of second coupling electrodes of the same type of a respective sector being electrically conductively connected on the second disk. The brought together coupling signals of each sector can then be picked up by way of the electrical connection.

In the case of rotary encoders according to the invention in which both the coupling signals of the same type of the first sensor ring and the coupling signals of the second sensor ring are respectively brought together sector-by-sector, it is advantageous if the number of sectors of the first sensor ring differs from the number of sectors of the second sensor ring. Alternatively or additionally, the sectors of the first sensor ring are arranged offset, e.g. by 30° or 60°, from the sectors of the second sensor ring, as a result of which different regions of the first and second disk are covered, even in the case of the same number and size of the sectors. The extent to the offset is preferably matched to the number of sectors; for example it is 45° in the case of respectively four equally sized sectors per sensor ring.

As a further optional feature, the rotary encoder has a first and a second signal transducer, e.g. an ADC. The first or, preferably, the second coupling electrodes are connected directly or indirectly to respectively one of the two signal transducers. In the case of sensor rings which, according to the invention, have a subdivision into sectors in respect of the coupling signals, the first or second coupling electrodes are connected sector-by-sector and type-by-type to one of the two signal transducers. That is to say the coupling signals of the at least one sector and one type are applied to each signal transducer. By way of example, if the rotary encoder has a subdivision into three sectors of respectively 120° in relation to the coupling signals, the coupling signals of the first sector and the first type are guided to the first signal transducer and the coupling signals of the first sector and the second type are guided to the second signal transducer. Accordingly, the coupling signals of the two other sectors are guided to the first and second signal transducer, wherein the coupling signals of one type are guided to the same signal transducer for all sectors of a or to different signal transducers for different sectors. Here, optionally, the assignment by means of switches comprised by the rotary encoder is interchangeable from the first to the second signal transducer and vice versa for each sector and each type of coupling signals or second coupling electrodes, i.e. the connection between the second coupling electrodes and signal transducers is interchangeable sector-by-sector and type-by-type. Expressed differently, the brought together coupling signals of the various sectors and types are then appliable to different signal transducers and this assignment can be changed from one signal transducer to the other. By means of such an alternating assignment of the signal transducers by the coupling signals of the individual sectors of at least one of the two sensor rings, monitoring of the measuring axis or disk movement (axis monitoring) is advantageously made possible, e.g. in respect of wobbling or eccentric movements.

In order to increase the robustness in relation to eccentricities of the first and/or second disk, in the case of at least one sensor ring the radial extent of the first coupling electrodes differs from the radial extent of the second coupling electrodes, which couple therewith, in some embodiments. As a result, capacitive coupling between receiver electrodes and emitter electrodes, which is uninfluenced by an eccentric behavior, is provided, which is why such features flank the compensation, described above, of components, more particularly low-frequency components, of the error spectrum. Here, the radial extent of the second coupling electrodes is advantageously greater than that of the first coupling electrodes.

Optionally, the first and/or second coupling electrodes are formed for a sinusoidal signal characteristic of the coupling signal in such a way that a sinusoidal profile of the capacitive coupling is generated by a rotation of the first disk relative to the second disk. As a further option, directly adjacent first coupling electrodes are aligned in a radially opposite manner to one another. Here, these have such different forms that the different radial locations of directly adjacent first coupling electrodes caused by the opposite alignment and, possibly, the sinusoidal form of the first coupling electrode are compensated, as a result of which possible interference caused by eccentricity and/or a tilt is reduced or prevented.

In order to compensate signal crosstalk, reduce or shield external interference signals and/or change the distance between the first and second coupling electrodes, and hence the capacitive coupling, some embodiments have at least one electrically shielding protective electrode, preferably with a ring-shaped embodiment, at least on the first disk, which protective electrode completely or partly surrounds the first coupling electrodes. Additionally, the second disk optionally has an electrically shielding protective electrode ring for reducing external interference signals.

The present invention advantageously provides a capacitive rotary encoder, by means of which angles are determinable in an absolute and precise manner by combining two or more sensor rings, matched to one another, with a multiplicity of first and second coupling electrodes. The advantages provided by using time-varying coupling signals and a multiplicity of coupling electrodes are used in all sensor rings in the present rotary encoder. The advantage arising from the rotary encoder according to the invention with at least two sensor rings lies in increasing the precision when determining the angle with the same demands on production and assembly accuracy or in greater tolerances during production and assembly in the case of unchanging precision than is the case for absolute capacitive rotary encoders according to the prior art.

By using sensor rings matched to one another there advantageously is a complete elimination or at least partial reduction of error components, which would otherwise reduce the precision of the angle determination, in the error spectrum of the rotary encoder as a whole. Likewise, there advantageously is a reduction or compensation of error components by the sector-by-sector bringing together of coupling signals and by evaluating the coupling signals also in respect of the coupling signal amplitudes. As a result of these features, there are increases in precision or larger manufacturing/assembly tolerances and hence cost advantages.

Therefore, advantageously, a rotary encoder according to the invention compensates both low-frequency and relatively high and high-frequency components of the error spectrum, i.e. a very large bandwidth of measuring errors is taken into account, as a result of which the present invention provides a "holistic" compensation of errors when determining angles, which significantly improves the measurement accuracy of the present rotary encoder over rotary encoders according to the prior art. It is particularly advantageous that the rotary encoder according to the invention, by way of combining two or more sensor rings according to the invention, brings about an improved self-compensation compared to absolute capacitive rotary encoders according to the prior art. As a result of this, a highly accurate compensation of errors is provided even without a highly accurate external reference, with, inter alia, the advantage being achieved that an error compensation can take place at the user with a relatively small time and cost outlay after the assembly of the rotary encoder. For a self compensation or self calibration of the rotary encoder according to the invention, a relative movement of the first disk to the second disk over at least the whole circle, i.e. 360°, is carried out once, as a result of which all compensatable error components are compensated or all error parameters are determined. If some of the error parameters are known in advance or invariant or need not be compensated, which is the case, for example, for those rotary encoders where angles within a relative movement of less than 360° are to be determined, such as e.g. in robot arms or articulated arms with a restricted range of rotation, a rotation through less than 360° is correspondingly sufficient for self compensation.

The present invention moreover relates to a method for determining angles for a rotary encoder according to the invention. Within the scope of the method, the first or second coupling electrodes of a respective sensor ring are actuated by time-varying coupling signals. Coupling signals are transmitted between the first and second coupling electrodes by means of capacitive coupling, wherein the transmission is dependent on the relative location of the first and second coupling electrodes in relation to one another or dependent on the relative location of the first disk to the second disk the coupling signals. Therefore, an angle is determinable by means of the signal evaluation of the coupling signals transmitted between the first and the second coupling electrodes, wherein the signal evaluation is brought about in a differential manner, as a result of which, inter alia, external interference signals are eliminated. The angle to be determined is respectively determinable in an ambiguous manner for each sensor ring in isolation on the basis of the coupling signals of the first sensor ring and on the basis of the coupling signals of the second sensor ring. These ambiguities are resolved by evaluating the coupling signals from both sensor rings, i.e. from both the first and the second sensor ring, which is why angles are determined in an absolute manner using the method according to the invention. In particular, the ambiguities are resolvable due to the co-prime nature of the first alpha-interval overall number in relation to the second alpha-interval overall number.

Optionally, as part of the method according to the invention, errors are compensated in embodiments of rotary encoders according to the invention, in which coupling signals of the second coupling electrodes are brought together sector-by-sector, by virtue of there being a comparing evaluation of coupling signals from different sectors. Using this, it is predominantly low-frequency errors that can be compensated, which are caused by deviations of the arrangement of the first and/or second disk from an ideal location relative to the measuring axis. Alternatively or additionally, there is a determination of the deviation of the arrangement of the first and/or second disk from an ideal location relative to the measuring axis. As a further option, there is a separate readout of the coupling signals from each sector in such embodiments. The separate readout is brought about by virtue of the brought together coupling signals of the receiver electrodes from each sector being applied to separate signal transducers, in particular analog-to-digital converters. Alternatively, there is a separate readout by virtue of the brought together coupling signals of the second coupling electrodes from different sectors being applied with a time offset to a common signal transducer, more particularly an analog-to-digital converter, by means of time multiplexing. The latter alternative offers the advantage of a separate readout being made possible with comparatively few signal transducers.

As a further option, time multiplexing is used to actuate the coupling electrodes of a respective sensor ring with time-varying coupling signals for different coupling signal phases in a time-offset manner such that the time-varying coupling signals from different phases are applied at different times. As a further option, the signal-emitting coupling electrodes of the first sensor ring are actuated in a time offset manner in relation to those of the second sensor ring by means of time multiplexing.

As a further option, the amplitudes of the coupling signals are taken into account during the evaluation of the latter. As a result, deviations of the forms or the locations on the disks of the first and/or second coupling electrodes from ideal forms and ideal locations are compensated for, as a result of which a further increase in the precision or greater manufacturing tolerances are advantageously achieved than in the case of rotary encoders according to the prior art.

The present invention furthermore contains a computer program product or computer data signal, embodied by an electromagnetic wave, comprising program code for controlling or carrying out the method for determining angles.

The absolute capacitive rotary encoder according to the invention and the method according to the invention for determining angles are described in more detail in a purely exemplary manner below on the basis of exemplary embodiments depicted schematically in the drawing.

BRIEF DESCRIPTION OF THE DRAWINGS

In detail:
FIGS. 2a-c show schematic examples for the configuration and arrangement of the receiver electrodes and emitter electrodes and the actuation thereof with time-varying coupling signals,
FIG. 3 shows a schematic example for defined sequences of emitter electrodes of a first and second sensor ring.

DETAILED DESCRIPTION

Figure 1:
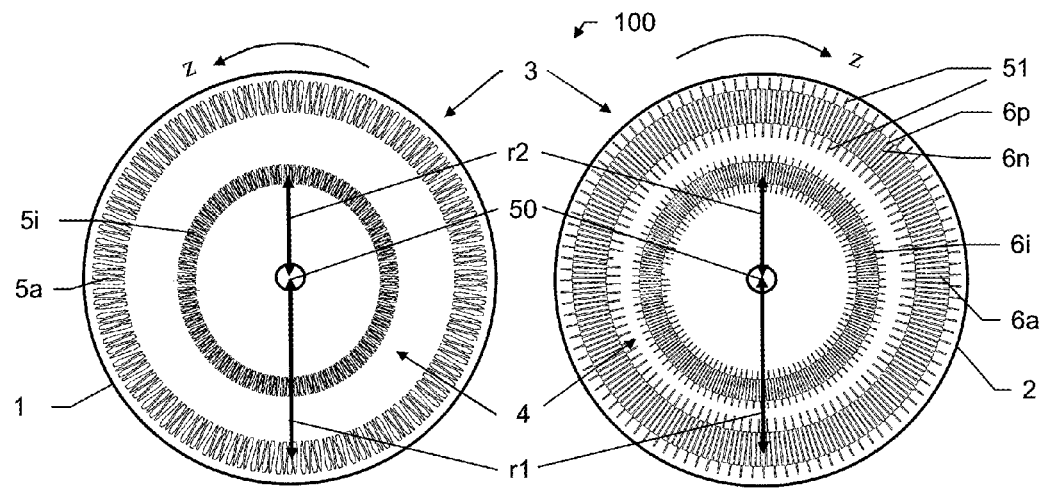
FIG. 1 schematically shows a first embodiment of a rotary encoder according to the invention.

FIG. 1 shows a rotary encoder 100 according to the invention comprising a first disk 1, denoted as stator 1 below, and a second disk 2, denoted as rotor 2 below. Stator 1 and rotor 2 are arranged coaxially and with a distance from one another on a measuring axis 50 and can rotate relative to one another about the measuring axis 50. However, in the illustration according to FIG. 1, the rotary encoder is "folded open" for improved clarity, i.e. stator 1 and rotor 2 both lie in the plane of the drawing, as a result of which the facing areas of the disks 1 and 2 are visible. The rotary encoder 100 has a first sensor ring 3 with a multiplicity of first coupling electrodes 5a, which are embodied as emitter electrodes in the example and arranged in a circular manner on the stator 1, and a multiplicity of second coupling electrodes 6a, which are embodied as receiver electrodes in the example and arranged in a circular manner on the rotor 2.

Furthermore, the rotary encoder 100 comprises a second sensor ring 4, likewise with a multiplicity of first coupling electrodes 5i, which are embodied as emitter electrodes and arranged on the stator 1 in a circular manner, and with a multiplicity of second coupling electrodes 6i, which are embodied as receiver electrodes and arranged on the rotor 2 in a circular manner. The first and second coupling electrodes 5a, 5i, 6a and 6i have a radial alignment, i.e. the longitudinal axes thereof point toward the measuring axis 50. The circular structures respectively formed by the emitter electrodes 5a and receiver electrodes 6a of the first sensor ring and the circular structures formed by the emitter electrodes 5i and the receiver electrodes 6i of the second sensor ring are respectively concentric to one another and to the measuring axis 50. The first and second coupling electrodes 5a and 6a of the outer sensor ring have the distance r1 from the measuring axis 50, the first and second coupling electrodes 5i and 6i of the inner sensor ring have the distance r2 from the measuring axis 50, always related to e.g. the center point of a respective electrode. As a result of the respectively equal distance r1 and r2 from the measuring axis 50 and the distance of the stator 1 to the rotor 2, the outer emitter electrodes 5a couple capacitively with the receiver electrodes 6a and, correspondingly, the inner emitter electrodes 5i couple capacitively with the inner receiver electrodes 6i. The sequence or arrangement of the emitter electrodes 5a of the first sensor ring and the sequence or arrangement of the emitter electrodes 5$i$ of the second sensor ring are matched to one another, more particularly by means of a first and second phase permutation described in more detail below, such that the angle determination is brought about in an absolute manner on the basis of the first sensor ring 3 and the second sensor ring 4. Expressed differently, an absolute rotary encoder 100 is present as a result of the combination of the first sensor ring 3 with the second sensor ring 4.

The receiver electrodes 5$a$ and 5$i$ of each sensor ring 3 or 4 are subdivided into two mutually opposite types (e.g. positive and negative), e.g. the receiver electrodes 6$p$ and the receiver electrodes 6$n$ of the outer sensor ring 3, such that a differential evaluation of coupling signals received by the receiver electrodes 6$a$ and 6$i$ by means of the capacitive functional principle is made possible. Here, respectively every second receiver electrode 6$a$ or 6$i$ along the circular direction z, i.e. along the imaginary circle line, of each sensor ring is of the same type; expressed differently, receiver electrodes 6$a$ and 6$i$ circularly directly adjacent to one another are of a different type. As depicted, all receiver electrodes 6$a$ or 6$i$ of one type are preferably electrically contacted at the end situated further toward the outside by contacts 51, while all receiver electrodes 6$a$ and 6$i$ of the other type are contacted by contacts 51 at the end situated further toward the inside. Here, the area for capacitive coupling of the receiver electrodes is the same size in both types.

Figure 2A:
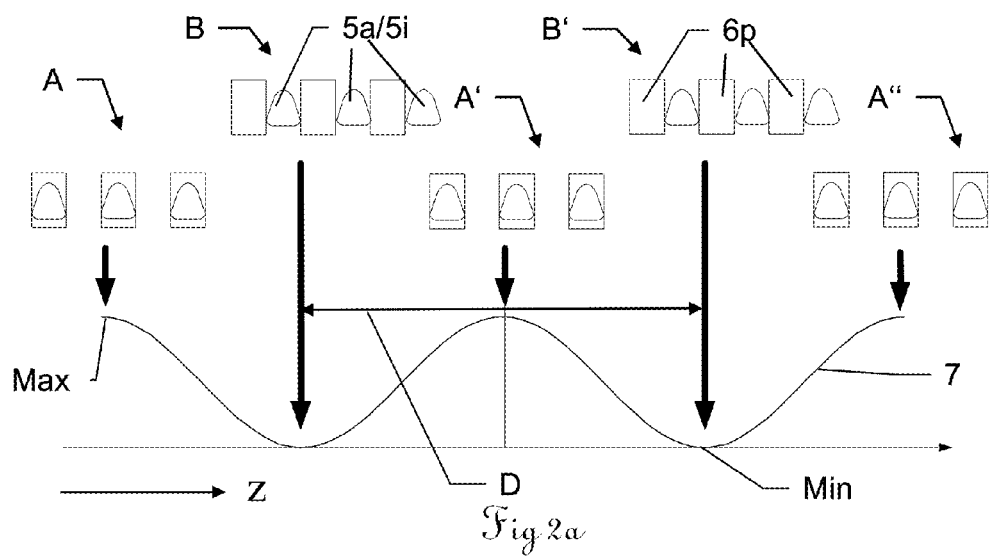

FIG. 2$a$ schematically shows an example for the configuration of the first and second coupling electrodes of the first and second sensor ring. What is depicted as a section from the stator in five different relative locations A, A', A", B and B' of the stator and rotor is in each case three emitter electrodes 5$a$ and 5$i$ of the same coupling signal phase of a sensor ring as a section from the stator and, in a superimposed manner in the drawing, in each case three rectangular receiver electrodes 6$p$ of one type from the same sensor ring as a section of the rotor. For a better overview, the curvature of the circle along the circular circle line direction z is not considered for improved clarity in the drawing of FIG. 2$a$ and also in subsequent FIGS. 2$b$-3$a$. Moreover, for simplicity, the likewise rectangular receiver electrodes of the opposite type, which are arranged between the receiver electrodes of the depicted type 6$p$, have been omitted in FIG. 2$a$. For a sinusoidal characteristic of the coupling signals, the receiver electrodes 6$p$ have the depicted rectangular form and the emitter electrodes 5$a$ and 5$i$ have the depicted sinusoidal form, wherein receiver electrodes 6$p$ and emitter electrodes 5$a$ and 5$i$ have at least an approximately equal width as an extent in the z-direction. Hence, in the case of a relative movement in the circular direction z of rotor in relation to stator, and hence of the first coupling electrodes in relation to the second coupling electrodes or 5$a$ and 5$i$ in relation to 6$p$, there are transitions from states with a complete superposition of emitter electrodes and receiver electrodes with one polarity (relative locations A, A' and A") to states in which no superposition is present (relative locations B and B'). As a result, the depicted sinusoidal profile of the coupling signal 7 for one phase of a sensor ring with maxima of the signal amplitude for complete superposition at the relative locations A, A' and A" and with minimum for superposition-free relative locations B and B' emerges. The coupling signals transmitted between the first and second coupling electrodes contain information about the angle as relative location of the first disk to the second disk. By a signal evaluation of the coupling signals transmitted between the first and second coupling electrodes of an individual sensor ring, an angle is determinable incrementally in this case. Expressed differently, an angle to be determined is only determinable uniquely within the period length D, which corresponds to twice the electrode width and is depicted in FIG. 2$a$ as a distance between two minima.

The amplitudes of the individual coupling signals are optionally taken into account during the evaluation thereof, as a result of which deviations from an ideal electrode geometry and deviations from an ideal location of the second coupling electrodes 6$p$ (or 6$n$) and/or first coupling electrodes 5$a$ and 5$i$ on the rotor or stator and/or deviations from ideal electrode forms, e.g. deviations from the ideal rectangular or sinusoidal shape, are advantageously compensatable.

FIG. 2$b$ shows a theoretical relative arrangement of two receiver electrodes 6$p$ and 6$n$ as second coupling electrodes of both types in relation to four emitter electrodes 5R-5U as first coupling electrodes. The emitter electrodes 5R-5U are actuated by time-varying signals, e.g. in the form of AC voltage signals with the same amplitude and frequency, and have four different coupling signal phases R, S, T and U. By means of capacitive coupling, the coupling signals are received by the receiver electrodes 6$p$ and 6$n$ and fed indirectly or directly to an evaluation unit via the contacts 51 with different polarity for the differential evaluation.

As already mentioned the width B1 of the receiver electrodes 6$p$ and 6$n$ equals the width B2 of the emitter electrodes 5R-5U at the widest position thereof. Alternatively, in order to take edge effects into account, it may be advantageous to keep the width B2 of the emitter electrodes 5R-5U slightly smaller than the width B1 of the receiver electrodes 6$p$, 6$n$. In order to compensate eccentricities of the stator and/or rotor, the receiver electrodes 6$p$ and 6$n$ advantageously have, as depicted, a radial extent L2, i.e. a length along the longitudinal axis, which is greater than the radial extent L1 of the emitter electrodes 5R-5U of the same sensor ring. Even in the case of a deviation, caused by an eccentric behavior, from an ideal location of the stator in relation to the rotor in all rotary positions of the stator in relation to the rotor, capacitive coupling which is at least largely uninfluenced by said deviation is ensured as a result of the radial alignment of the emitter electrodes 5R-5U and receiver electrodes 6$p$ and 6$n$ and the differing lengths L1 and L2 thereof.

The depicted arrangement of a pair of adjacent receiver electrodes 6$p$, 6$n$ with different types or of four adjacent emitter electrodes 5R-5U with all four used coupling signal phases define a so-called alpha-interval $\alpha$. The width of the alpha-interval $\alpha$ is defined by the circular width of the emitter electrodes. An alpha-interval $\alpha$, depending on the number of coupling signal phases, of the (only theoretically possible) arrangement according to FIG. 2$b$ therefore respectively represents the smallest self-contained capacitive signal coupling unit of the first and second sensor ring.

Here, the four emitter electrodes 5R, 5S, 5T and 5U are respectively shifted in relation to one another by a quarter of the width of the alpha-interval. Therefore, the sinusoidal coupling signals generated thereby are geometrically phase offset from one another by 90° with the receiver electrodes of one type.

Of course, since such an arrangement with overlapping electrodes is not possible in practice, emitter electrodes are selectively omitted by means of a phase permutation, as depicted in the subsequent FIG. 2$c$.

Figure 2B:
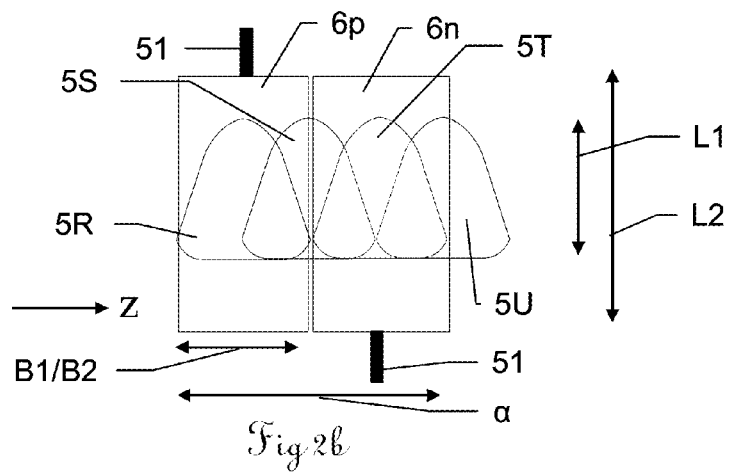

FIG. 2$c$ shows, in the center, the arrangement, impossible in practice, of overlapping first coupling electrodes as emitter electrodes 5R-5U from FIG. 2$b$ with the simple sequence of phases RSTU continued in the circular direction z, wherein the arrangement from FIG. 2b is repeated nine times, i.e. wherein nine alpha-intervals α are depicted. The dashed vertical lines in each case show emitter electrodes of the same phase 5R as a start of a new alpha-interval α. By means of the principle of phase permutation, described in the following, emitter electrodes of these thirty-six emitter electrodes are now omitted in a targeted manner.

An example of a first phase permutation 21 is depicted at the bottom of FIG. 2c. Starting from the left in the drawing, the emitter electrodes 5R and 5T with the phases R and T are kept from the first eight emitter electrodes, while the emitter electrodes with the phases S and U are left out. From the next eight emitter electrodes, the emitter electrodes 5S and 5U are kept while those with the phases R and T are left out. From the next 20 emitter electrodes, respectively electrodes 5R, 5S, 5T and 5U are kept and respectively 3 electrodes 5R, 5S, 5T and 5U are left out, as depicted at the bottom of FIG. 2c. The remaining 16 emitter electrodes form a first permutation interval 8, abbreviated P-interval, with the phase sequence R-T-R-T-S-U-S-U-T-R-T-R-U-S-U-S. At the end of a first P-interval 8, this phase or emitter electrode sequence is repeated such that the whole sensor ring is covered. Therefore, of these 16 emitter electrodes, respectively four emitter electrodes correspond to each one of the four phases, as a result of which there is an equal distribution of the four phases over the whole first P-interval 8 and, hence, over the whole sensor ring. The length of the first P-interval 8 corresponds to the length of the arrangement of the nine-times repeating simple arrangement in the center of FIG. 2b, i.e. it corresponds to nine alpha-intervals α. The first number P1 of alpha-intervals α, which corresponds to the first P-interval 8, is therefore P1=9. Expressed differently, a first P-interval 8 constitutes a combination of nine alpha-intervals α.

A second phase permutation 22 is depicted at the top of FIG. 2c. What emerges is a second P-interval 9 with the phase sequence R-T-S-U-T-R-U-S. The second number P2 of alpha-intervals α, which corresponds to the second P-interval 9 is therefore P2=5. After the end of a second P-interval 9, this phase or emitter electrodes sequence is respectively repeated over the whole sensor ring, as indicated at the top of FIG. 2c by the next second P-interval 9a.

Due to the different first and second phase permutations 21 and 22 as different combinations of alpha-intervals α, the first P-interval 8 has more alpha-intervals α than the second P-interval 9, the circular extent of a second P-interval 9 is shorter than that of a first P-interval 8 and the arrangement of the emitter electrodes is not congruent. Thus, in the first P-interval 8, emitter electrodes are partly situated at points at which there are points without emitter electrodes in the second P-interval 9 and vice versa. Therefore, the first and second sensor ring are different from one another due to the different first and second phase permutation and are matchable to one another by configuring the first and second phase permutation.

In order to obtain an electrically sufficient insulating distance between the remaining emitter electrodes, while nevertheless having a compact arrangement of the emitter electrodes, directly adjacent emitter electrodes in each case advantageously have an opposite radial alignment both in the first and in the second P-interval 8 and 9, i.e. the respective next but one emitter electrodes are, as depicted in FIG. 2c, rotated by 180° in respect of the respective next emitter electrodes. Here, emitter electrodes with the one alignment are optionally formed slightly differently than the emitter electrodes with the opposite alignment in order to compensate differences such as different locations of the individual emitter electrodes as a result of the circular arrangement, as a result of which interfering influences, which may otherwise occur in the case of an identical form of all emitter electrodes, caused by deviations from the ideal location of the stator and/or rotor are compensated for.

The actuation of emitter electrodes of one phase of one or both sensor rings, e.g. of all emitter electrodes 5R, is optionally brought about by means of time multiplexing with a time offset from the actuation of the emitter electrodes of the other phases, i.e., for example, the emitter electrodes 5T-5U, as a result of which mutual interference of the coupling signals is avoided.

FIG. 3 shows, as a section from the stator, a complete set of emitter electrodes 5a of the first sensor ring and a complete set of second emitter electrodes 5b of the second sensor ring, which each form the stator-side first coupling electrodes of the first or of the second sensor ring in the circular direction z. The set of a multiplicity of emitter electrodes 5a of the first sensor ring has a number M1 of equal first P-intervals 8 according to FIG. 2c. In this example, the number M1 is four first P-intervals 8-8c. The set of a multiplicity of emitter electrodes 5b of the second sensor ring has a number M2 of equal second P-intervals 8 according to FIG. 2c; in the example, these are seven second P-intervals 9-9f. Here, in addition to the selected phase permutation and consequently the sequence of the emitter electrodes of different phases, the number M1 or M2 of P-intervals 8 or 9 per sensor ring is naturally also dependent on the (mean) radius of the respective sensor ring and the (mean) dimension or circular extent of the emitter electrodes.

Since the first P-intervals 8-8c are equivalent to one another, an angle is only determinable ambiguously on the basis of only the first sensor ring. This applies equivalently to the second sensor ring. In order to unambiguously determine angles with the rotary encoder, the arrangement of the coupling electrodes of the first sensor ring differs in a defined manner from that of the second sensor ring such that the ambiguity is resolved on the basis of the coupling signals of both sensor rings. In the example, the first overall number N1 of the alpha-intervals α of the first sensor ring is co-prime to the second overall number N2 of the alpha-intervals α of the second sensor ring. Expressed differently, in the present example, the mathematical product M1*P1 of the number M1 (four in this example) of the first P-intervals 8 and the first number P1 of the alpha-intervals α (nine in this example) of a first P-interval 8 is co-prime to the product M2*P2 of the number M2 (seven in this example) of the second P-intervals 9 and the second number P2 of the alpha-intervals α (five in this example) of a second P-interval 9: N1=M1·P1=4·9=36⊥N2=M2·P2=7·5=35. The first and second phase permutation are therefore selected matched to one another in such a way that, on the basis of the two sensor rings matched to one another in such a way, angles are determinable absolutely by the rotary encoder according to the invention.

As an option, the emitter electrodes 5a of the first sensor ring are actuated with a time offset from the emitter electrodes 5i of the second sensor ring by time-varying signals by means of time multiplexing, as a result of which mutual interferences are also avoidable if the first and second emitter electrodes 5a and 5i (or the respectively associated receiver electrodes) are arranged close to one another without shielding on the stator (or on the rotor). Consequently, the radial distance between the first, outer sensor ring and the second, inner sensor ring can be kept low, which is advantageous in view of a compact rotary encoder.

The sequence of emitter electrodes 5a of the outer sensor ring and of the emitter electrodes 5i of the inner sensor ring are optionally selected matched to one another in such a way that weaknesses in the error spectra of the first and of the second sensor ring compensate one another at least in portions of the error spectra, as is described below on the basis of FIGS. 4a-c. In the example, this is brought about by matching the first phase permutation to the second phase permutation and, consequently, matching the arrangements of the emitter electrodes 5a and 5i and the number M1 of the first P-intervals 8 and the number M2 of the second P-intervals 9.

Figure 4A:
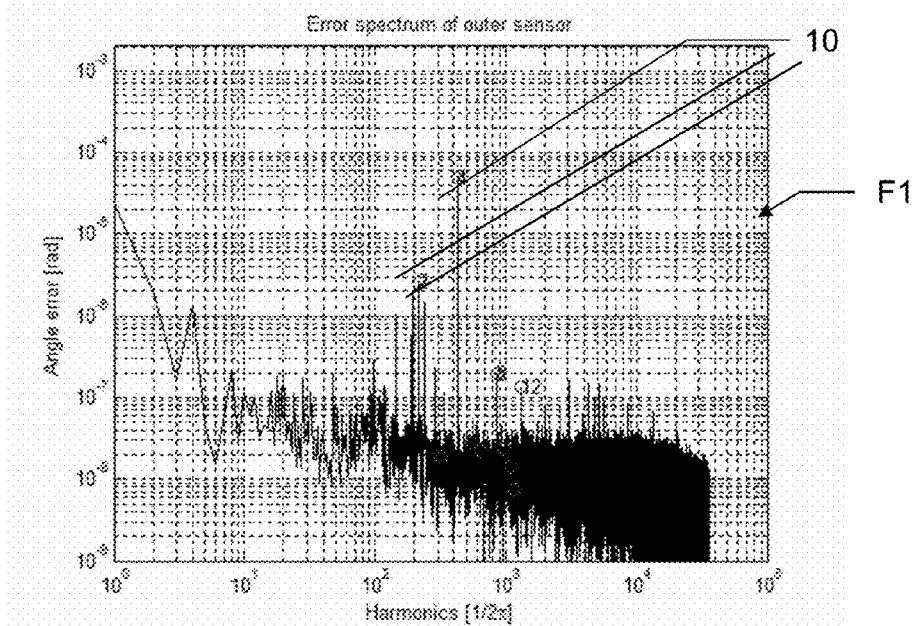
FIGS. 4a, 4b show examples for error spectra of a rotary encoder with sensor rings matched to one another.
Figure 4B:
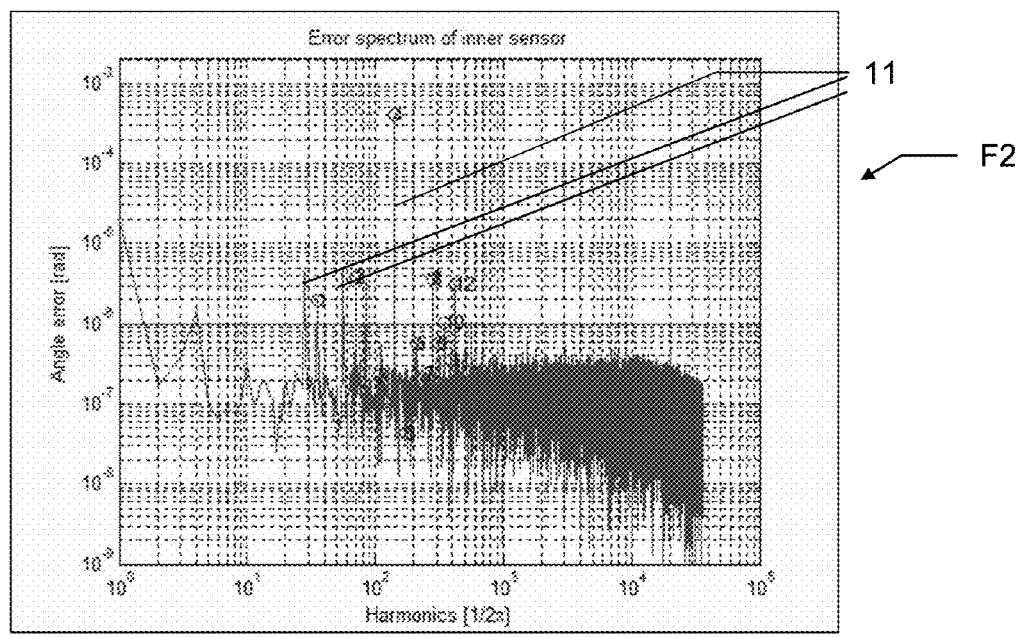

FIGS. 4a and 4b show two purely exemplary error spectra. FIG. 4a shows the error spectrum F1 of the outer sensor ring with first and second coupling electrodes, the phase sequence of which is defined by a first phase permutation like, for example, according to FIG. 2c. FIG. 4b shows the error spectrum F2 of the inner sensor ring with first and second coupling electrodes, the phase sequence of which is defined by a second phase permutation like, for example, according to FIG. 2c or FIG. 3. The horizontal axis respectively depicts the frequency as the number of harmonics while the vertical axis depicts the angle error of the respective harmonic.

The error spectrum F1 (FIG. 4a) of the first sensor ring shows weaknesses 10, for example in the section between the $100^{th}$ and $500^{th}$ harmonic, the amplitudes or angle error of which have a pronounced embodiment. The amplitudes of these harmonics are only pronounced weakly in the error spectrum F2 of the second sensor ring (FIG. 4b), as a result of which these error components of the first sensor are compensatable by the second sensor. Conversely, the error spectrum F2 shows weaknesses 11, for example in the section between the $11^{th}$ harmonic and the $200^{th}$ harmonic. The amplitudes of these harmonics are small in the error spectrum F1 of the first sensor ring, as a result of which these error components of the second sensor are compensatable by the first sensor. For the purposes of compensating the main lines of the error spectra, the first alpha-interval overall number N1 of the first sensor ring and all multiples thereof are unequal to the second alpha-interval overall number N2 of the second sensor ring and all multiples thereof. Advantageously, secondary lines of the error spectra also compensate one another. The sequences of the first coupling electrodes or the phase permutations of the first and second sensor ring are particularly advantageously matched to one another in such an optimized manner that the two error spectra F1 and F2 are orthogonal to one another or do not overlap one another.

Figures 5, 6:
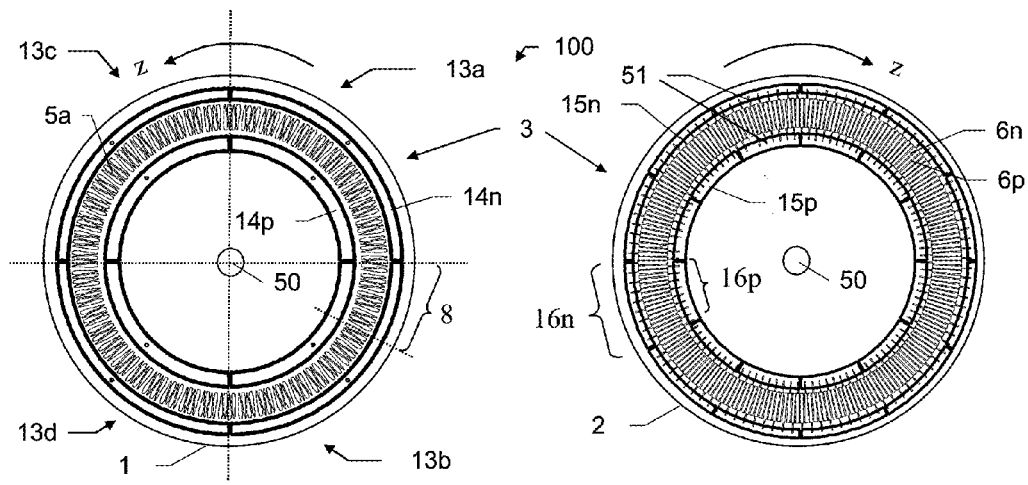
FIG. 5 shows a schematic example for a section from an embodiment with transmission electrodes and sectors for sector-by-sector bringing together of coupling signals.
FIG. 6 shows an exemplary table for assignment states of a rotary encoder with four sectors, FIG. 7 schematically shows a second embodiment of a rotary encoder according to the invention comprising signal transmission means

FIG. 5 shows a rotary encoder 100 comprising stator 1 and rotor 2, wherein only the first sensor ring 3 of the two or more sensor rings is plotted for reasons of clarity. In the first sensor ring 3 of the depicted embodiment, the coupling signals with the same polarity of one sector are brought together sector-by-sector. To this end, the rotor 2 has transmission electrodes 15n, which are connected in an electrically conductive manner to transmission electrodes 6n of the one type (see FIG. 1) by way of contacts 51, and transmission electrodes 15p, which are connected in an electrically conductive manner to receiver electrodes 6p of the opposite type. The transmission electrodes 15n form an outer ring about the receiver electrodes 6p and 6n; the opposite transmission electrodes 15p form an inner ring. Accordingly, the stator 2 has one ring of transmission electrodes 14n per type, once around the emitter electrodes 5a on the outside and once around the emitter electrodes 5a on the inside, which transmission electrodes are in each case coupled to the transmission electrodes 15n and 15p of the rotor 2 in a capacitive manner. The transmission electrodes 14p and 14n are electrically insulated from the emitter electrodes 5a. From the transmission electrodes 14p or 14n, the coupling signals are fed to respectively one signal transducer for differential signal evaluation. Independently of a sector-by-sector bringing together, a coupling signal transmission by means of transmission electrodes offers the advantage over a direct connection of the rotor 2 to an evaluation unit that the rotor 2 is thereby embodied as a passive second disk, simplifying the production process of the rotor 2.

For the purposes of robustness in relation to eccentricities of the stator 1 and/or of the rotor 2, the radial extent of the stator-side transmission electrodes 14p and 14n is advantageously greater than the radial extent of the rotor-side transmission electrodes 15p and 15n, as depicted. As a further option, the transmission electrodes 14p and 14n of the stator 1 and/or the transmission electrodes 15p and 15n of the rotor have mutually equal areas, for the purposes of which the radial extent of the transmission electrodes 14n and 15n situated further toward the outside is less than that of the transmission electrodes 14p and 14n situated further toward the inside. If the stator 1 or the rotor 2 respectively has only one circular transmission electrode 14p, 14n, 16p and 16n per type, then said transmission electrode has an electrically insulating break for preventing electrical ring currents.

However, as depicted, the stator 1 is preferably subdivided into at least three sectors in relation to the transmission electrodes 14p and 14n. The example considers four equally distributed and equally sized sectors 13a-13d. Each sector 13a-13d has a transmission electrode 14p or 14n per type, wherein the transmission electrodes 14p and 14n of the individual sectors are electrically insulated from one another. As a result of transmission electrodes 14n and 14p embodied thus, both the coupling signals which originate from the one type of receiver electrodes and the coupling signals originating from the opposite type of receiver electrodes are brought together sector-by-sector. Expressed differently, all coupling signals which are transmitted from the rotor 2 to the stator 1 within the respective sector 13a-13d by means of capacitive coupling separated by type are unified by the transmission electrode 14p or 14n comprising the respective sector 13a-13d. Here, the readout of each sector 13a-13d is optionally brought about separately for each sector 13a-13d by virtue of the rotary encoder having a separate signal transducer per sector or by virtue of the brought together coupling signals from different sectors being guided to a common signal transducer with a time offset, for the purposes of which time multiplexing is used.

Optionally, the number of receiver electrodes per polarity 6n and 6p is a mathematical multiple of the number of sectors 13a-13d, i.e. a multiple of four in this example. As a further option, the rotor 2, as depicted in FIG. 5, has a plurality of transmission electrodes 16n and 16p per polarity, which transmission electrodes are respectively electrically connected to a sequence 16n or 16p of receiver electrodes 6a. Here, the circular extent of such a sequence 16n and 16p preferably corresponds to the circular extent of a P-interval 8 on the stator 1. In the example, the stator 1 has twelve P-intervals, which is why the rotor 2 has 12 sequences 16n or 16p of receiver electrodes 6a per polarity and, correspondingly, 12 transmission electrodes per type 15n and 15p. What is achieved by such a connection of sequences 16p and 16n, the angle range of which correspond to that of a P-interval 8, is that the sinusoidal form of the coupling signal is maintained, even in the case of the sector-by-sector bringing together of coupling signals, without additional measures. Alternatively, the rotor 2 has one transmission electrode 15n and 15p per receiver electrodes 6a and type.

What a sector-by-sector bringing together of coupling signals, brought about in the present embodiment by means of the transmission electrodes 14p and 14n split sector-by-sector, brings about is that these coupling signals brought together in a sector-by-sector manner are evaluated in a comparative manner, for example by adding with opposite sign. Such a comparative evaluation establishes information about a deviation of the arrangement of the first and/or second disk from an ideal location relative to the measuring axis. By means of such information, it is possible to compensate errors or components, predominantly low frequency errors or components, of the error spectrum, such as e.g. eccentricity or tilt, which are caused by deviations of the arrangement of the stator 1 and/or rotor 2 from an ideal location relative to the measuring axis 50. Additionally or alternatively, information about a deviation of the arrangement of the first and/or second disk from an ideal location relative to the measuring axis is used to determine this deviation itself in the form of a derived measurement value.

For a more detailed error compensation, in particular of low-frequency error components, in embodiments for a highly precise angle determination, it is not only one sensor ring, but each sensor ring, which, in relation to the coupling signals, has sectors for the sector-by-sector bringing together and comparative evaluation of the coupling signals with the same polarity of the respective sensor ring. In some embodiments, the sectors of the first sector ring are different in a coordinated manner from the second sensor ring. By way of example, the number of sectors of the first sensor ring differs from the number of sectors of the second sensor ring. Alternatively or additionally, the sectors of the first sensor ring are arranged offset from those of the second sensor ring. By way of example, both the first sensor ring and the second sensor ring have four sectors with a size of 90°, but these are shifted from one another by 45°.

Especially in embodiments in which the sectors for the sector-by-sector bringing together of the coupling signals are the same in both sensor rings (same size and same arrangement), the coupling signals of the individual sectors 13a-13d are applied to a first signal transducer and a second signal transducer in view of further improved monitoring and compensation of deviations from an ideal location relative to the measuring axis of stator and/or rotor. Here, respectively all sectors 13a-13d of the same sensor ring can be applied to the same signal transducer or coupling signals from the same sensor ring are applied partly to the first signal transducer and partly to the second signal transducer. Here, these assignment states are fixed or, alternatively, changeable even after assembly by means of switches.

The table in FIG. 6 shows six assignment states S1-S6 for a rotary encoder according to FIG. 5 with in each case four equal sectors 13a-13d and two analog-to-digital converters ADC1 and ADC2 and, in the first assignment state S1, all coupling signals of the first type (symbol n) are fed to the first ADC1 and, accordingly, all coupling signals of the second, opposite type (symbol p) are fed to the second ADC2. The second assignment state S2 is inverted to the first: all coupling signals of the second type p are guided to the first ADC1 and, accordingly, all coupling signals of the first type p are guided to the second ADC2. In the third assignment state S3, the coupling signals of the sectors 13a and 13b of the first type n and the coupling signals of the sectors 13c and 13d of the second type p are guided to the first ADC1 and, accordingly, the coupling signals of the sectors 13a and 13b of the second type p and the coupling signals of the sectors 13c and 13d of the first type n are guided to the second ADC1. In the fifth assignment state S5, the coupling signals of the first type n of the sectors 13a and 13d are guided to the first ADC1, as are the coupling signals of the second type p of the sectors 13b and 13c. The assignment states S4 and S6 are inverted to the states S3 and S5, respectively.

Figure 7:
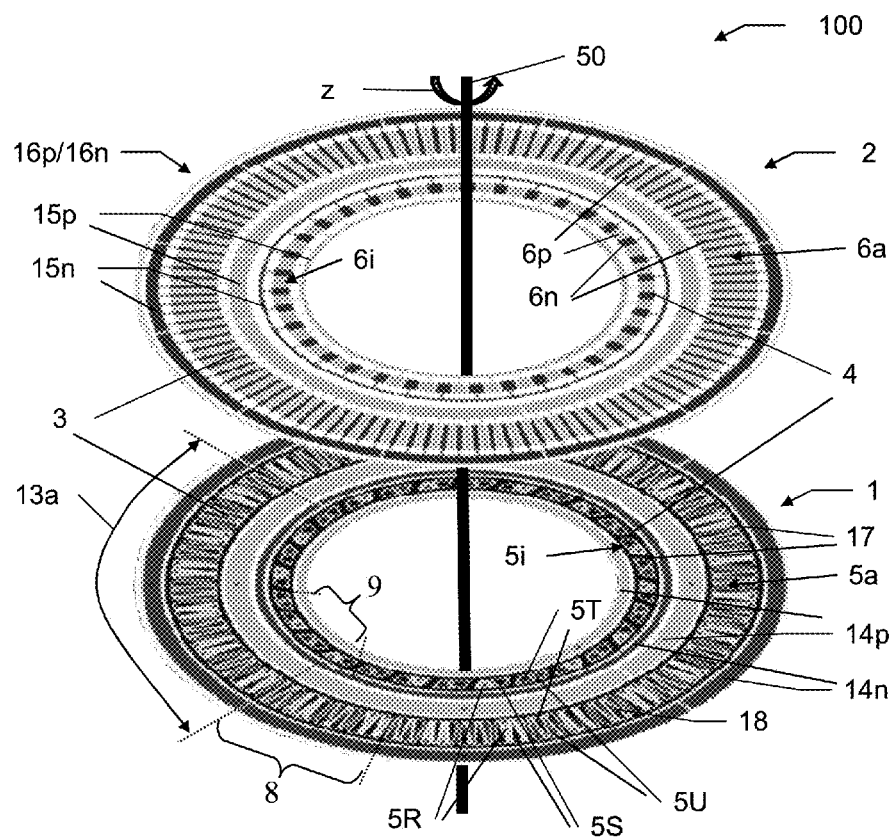

FIG. 7 shows a perspective view of a further example of a rotary encoder 100 according to the invention, comprising a stator 1 and rotor 2, with the distance between stator 1 and rotor 2 being drawn in an exaggerated manner for a better overview. The rotary encoder 100 has a first sensor ring 3 and a second sensor ring 4, respectively with a multiplicity of emitter electrodes 5a and 5i and a multiplicity of receiver electrodes 6a and 6i, with receiver electrodes of opposite type 6n and 6p respectively alternating in the two sensor rings 3 and 4. As first coupling electrodes, the emitter electrodes 5a and 5i in each case have four different phases 5R-5U. The phase-related sequence of the emitter electrodes 5a of the first, outer sensor ring 3 is defined by a first phase permutation according to FIG. 2c such that a row of sixteen first emitter electrodes 5a respectively form a first P-interval 8, wherein the first sensor ring 3 has a number M1 of twelve first P-intervals 8 and a first alpha-interval overall number N1. The phase-related sequence of the emitter electrodes 5i of the second, inner sensor ring 4 is defined by a second phase permutation according to FIG. 2c, and so a row of eight second emitter electrodes 5i in each case form a second P-interval 9, wherein the second sensor ring 4 has a number M2 of seven second P-intervals 9 and a second alpha-interval overall number N2. The first alpha-interval overall number N1 is co-prime with the second alpha-interval overall number N2. Moreover, the first and the second phase permutation, or the first and second P-interval 8 and 9 and the respective number thereof on the stator 1 are selected matched to one another in such a way that the error spectra of the first sensor ring 3 and of the second sensor ring 4 are orthogonal to one another.

In order to transmit the coupling signals from the rotor 2 to the stator 1, each sensor ring 3 and 4 has transmission electrodes 14p and 15p of the one type and transmission electrodes 14n and 15n of the opposite type on both the stator side and the rotor side. On the stator side, the first sensor ring 3 has four equally sized transmission electrodes 14p and 14n, which, per sector, cover a region of 90° in order to bring together the coupling signals of the first sensor ring 3 sector-by-sector in four sectors (one sector 13a is indicated in the drawing). The coupling signals, brought together sector-by-sector, of the first sensor ring 3 are evaluated in the comparative manner, as a result of which it is possible predominantly to compensate low-frequency components of the error spectrum of the first sensor ring 3 and therefore of the rotary encoder 100 overall.

In order to reduce or avoid interferences of the AC voltage signals and impairments of the sinusoidal form of the coupling signals, the first coupling electrodes 5a and 5i are in each case completely surrounded by an electrically shielding protective electrode ring 17. The radial extent of the respective protective electrode ring and the radial extent of the first coupling electrodes 5a and 5i and of the second coupling electrodes 6a and 6i are optionally matched to one another in such a way that the second coupling electrodes 6a and 6i are so much longer than the first coupling electrodes 5a and 5i that they also cover the region of the protective electrode ring 17. Expressed differently, the radial extent of the second coupling electrodes 6a and 6i equals the radial extent of the first coupling electrodes 5a and 5i and the protective electrode ring 17 put together.

In order to keep the distance between directly adjacent first coupling electrodes 5a and 5i as small as possible and, simultaneously, in order to maintain the sinusoidal form of the first coupling electrodes 5a and 5i and hence the sinusoidal characteristic of the coupling signals, the form of the first coupling electrodes 5a and 5i is selected, like in the example according to FIG. 7, in such a way that the opposite sides of directly adjacent first coupling electrodes 5a and 5i form an approximately straight line 18. This is particularly pronounced in the emitter electrodes 5a of the first sensor ring due to the relatively large radial extent thereof. By means of such shaping, a compact design of the rotary encoder 100 and an emitter electrode density that is as high as possible are achieved.

Figure 8A:
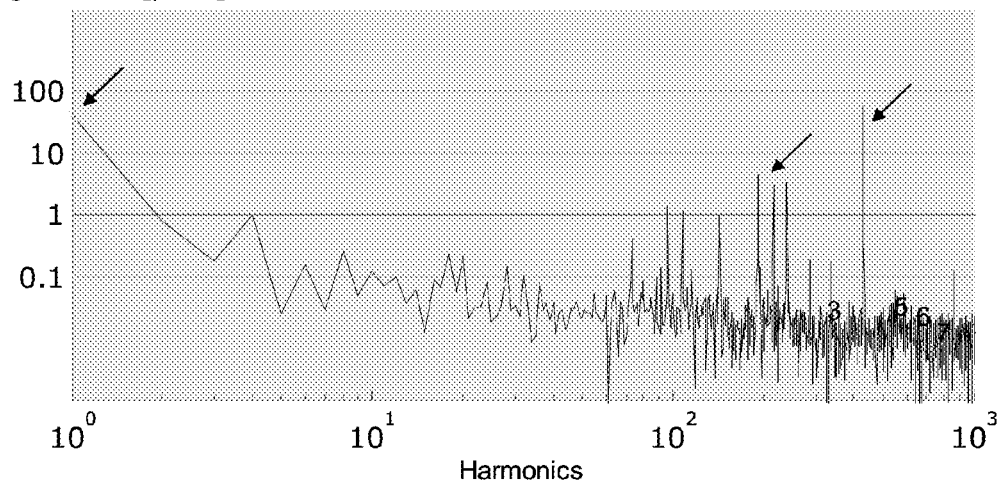
FIGS. 8a, 8b show examples for an error spectrum of a rotary encoder according to FIG. 7 before and after error self compensation.
Figure 8B:
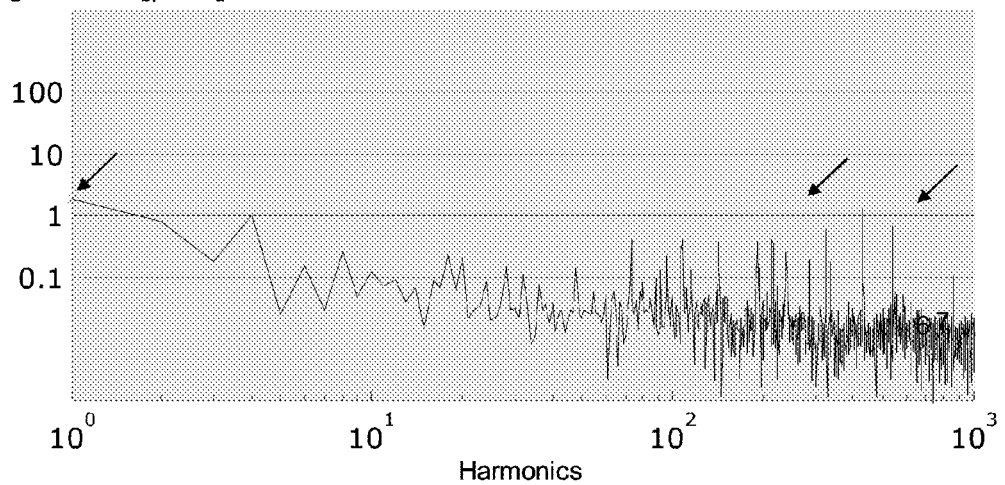

FIGS. 8a and 8b show overall error spectra of the rotary encoder according to FIG. 7 in an exemplary manner. The error spectrum according to FIG. 8a shows the error components of the individual harmonics before carrying out a self compensation or self calibration. Relatively large angle errors or high amplitudes can be identified e.g. in the low-frequency section, predominantly at the first harmonic, and in the high-frequency section; these are marked in FIG. 8a by small arrows.

FIG. 8b shows the error spectrum after a self compensation. As a result of the mutual matching of the first and second sensor ring, for example on the basis of the matched selection of the first and second phase permutation, and as a result of the sector-by-sector bringing together of coupling signals of the first sensor ring and the comparative evaluation thereof, a significant reduction in angle errors was achieved (identifiable, inter alia, at points marked by the small arrows). Weaknesses, which are caused e.g. by deformations like unevenness of the disk face of the stator and/or rotor, crosstalk of AC voltage and/or coupling signals, deviations from an ideal AC voltage signal and the like, of the first sensor ring are compensated for by the corresponding components of the second sensor ring and vice versa, and global error sources such as eccentricities of the disks or the wobbling thereof are compensated for by the subdivision of at least one sensor ring into sectors in view of the coupling signals. Thus, the present invention provides a rotary encoder which offers improved self compensation of errors compared to capacitive absolute rotary encoders according to the prior art and therefore enables a much more precise determination of angles compared to capacitive absolute rotary encoders according to the prior art.

It is understood that the figures shown and explained above only schematically illustrate possible exemplary embodiments. In particular, reference is made to the fact that the explicitly depicted and explained examples can be used—without exception—both separately from one another and in any combination with one another as a capacitive rotary encoder and that these examples are also combinable with corresponding devices and methods from the prior art.

What is claimed is:

1. An absolute capacitive rotary encoder, comprising:
   a first sensor ring and at least one second sensor ring, each comprising:
   a multiplicity of first coupling electrodes arranged in a circular shape on a first disk and aligned radially; and
   a multiplicity of second coupling electrodes arranged in a circular shape on a second disk and aligned radially, wherein:
   the circular widths of the first and second coupling electrodes of a respective sensor ring are matched to one another,
   the first disk and the second disk are arranged coaxially on a measuring axis and at a distance from one another,
   the first disk and the second disk are rotatable relative to one another about the measuring axis, wherein the distance between the first disk and the second disk is dimensioned in such a way that time-varying coupling signals are transmittable between the first and second coupling electrodes of a respective sensor ring by way of capacitive coupling, and
   an absolute angle is determinable by evaluating the coupling signals of both sensor rings transmitted between the first and second coupling electrodes,
   the first coupling electrodes of a respective sensor ring have at least three mutually offset coupling signal phases, wherein
   respectively one alpha-interval is defined on the basis of the number of coupling signal phases,
   a structure of the first coupling electrodes is predetermined by the alpha-intervals,
   each sensor ring has an alpha-interval overall number as the total of all alpha-intervals of the respective sensor ring and
   the first alpha-interval overall number of the first sensor ring and the second alpha-interval overall number of the second sensor ring are co-prime for determining an absolute angle,
   the sequence of the first coupling electrodes of the first sensor ring is defined by a first phase permutation and the sequence of the first coupling electrodes of the second sensor ring is defined by a second phase permutation such that,
   by means of the first phase permutation, respectively a row of circularly adjacent first coupling electrodes of the first sensor ring forms a first P-interval which corresponds to a first number of alpha-intervals, and
   by means of the second phase permutation, respectively a row of circularly adjacent first coupling electrodes of the second sensor ring forms a second P-interval which corresponds to a second number of alpha-intervals,
   the first sensor ring has a number of equal first P-intervals and the second sensor ring has a number of equal second P-intervals, and
   the second coupling electrodes are divided into at least two mutually alternate types for a differential signal evaluation of coupling signals, wherein, in the case of two types, second coupling electrodes on each sensor ring spaced apart by one in the circular direction are of the same type in each case.

2. The rotary encoder according to claim 1, wherein:
the second disk comprises a rotor disk.

3. The rotary encoder according to claim 1, wherein:
the first disk comprises a stator disk.

4. The rotary encoder according to claim 1, wherein:
the first coupling electrodes comprise emitter electrodes.

5. The rotary encoder according to claim 1, wherein:
the second coupling electrodes comprise receiver electrodes.

6. The rotary encoder according to claim 1, wherein:
the three mutually offset coupling signal phases comprise four coupling signal phases respectively offset by a quarter.

7. The rotary encoder according to claim 1, wherein:
in the case of at least one sensor ring, the coupling signals of the second coupling electrodes per type of a sector are brought together sector-by-sector, wherein:
the sectors are distributed over the whole sensor ring and
the number of sectors is at least three,
such that information about a deviation of the arrangement of the first and/or second disk from an ideal location relative to the measuring axis is establishable by a sector-related comparing evaluation of coupling signals, wherein the number of second coupling electrodes per type is a mathematical multiple of the number of sectors.

8. An absolute capacitive rotary encoder, comprising:
a first sensor ring and at least one second sensor ring, each comprising:
first coupling electrodes arranged in a circular shape on a first disk and aligned radially, and
second coupling electrodes arranged in a circular shape on a second disk and aligned radially,
wherein:
the circular width of the first and second coupling electrodes of a respective sensor ring are matched to one another,
the first disk and the second disk are
arranged coaxially on a measuring axis and at a distance from one another and
rotatable relative to one another about the measuring axis, wherein
the distance between the first disk and the second disk is dimensioned in such a way that time-varying coupling signals are transmittable between the first and second coupling electrodes of a respective sensor ring by way of capacitive coupling, and
an absolute angle is determinable by evaluating the coupling signals of both sensor rings transmitted between the first and second coupling electrodes,
the first coupling electrodes have at least three mutually offset coupling signal phases, wherein
respectively one alpha-interval is defined on the basis of the number of coupling signal phases,
a structure of the first coupling electrodes is predetermined by the alpha-intervals,
each sensor ring has an alpha-interval overall number as the total of all alpha-intervals of the respective sensor ring,
the second coupling electrodes are divided into at least two mutually alternate types for a differential signal evaluation, wherein second coupling electrodes, respectively spaced apart by one in the circular direction, of each sensor ring are of the same type, and,
in the case of at least one sensor ring, the coupling signals of the second coupling electrodes of a type of a sector are brought together sector-by-sector, wherein
the sectors are distributed over the whole sensor ring and
the number of sectors is at least three,
such that information about a deviation of the arrangement of the first and/or second disk from an ideal location relative to the measuring axis is establishable by a sector-related comparing evaluation of coupling signals from different sectors, wherein the number of second coupling electrodes is a mathematical multiple of the number of sectors.

9. The rotary encoder according to claim 8, wherein:
by means of the information about a deviation of the arrangement of the first and/or second disk from an ideal location relative to the measuring axis,
low frequency errors which are caused by a deviation of the arrangement of the first and/or second disk from an ideal location relative to the measuring axis, are compensatable and/or
the deviation of the arrangement of the first and/or second disk from an ideal location relative to the measuring axis is determinable.

10. The rotary encoder according to claim 8, wherein:
the coupling signals of the second coupling electrodes of the same type are combined sector-by-sector, respectively both in the first sensor ring and in the second sensor ring, wherein
the number of sectors of the first sensor ring differs from the number of sectors of the second sensor ring and/or
the sectors of the first sensor ring are arranged offset to the sectors of the second sensor ring,
and/or the coupling signals are combined sector-by-sector by virtue of the second coupling electrodes of the same type of a respective sector being connected in an electrically conductive manner on the second disk.

11. The rotary encoder according to claim 8, wherein:
the sequence of the first coupling electrodes of the first sensor ring and the sequence of the first coupling electrodes of the second sensor ring are matched to one another in such a way that weak points in the error spectra of the two sensor rings compensate one another at least in portions in relatively high frequency and/or high-frequency portions of the error spectra, wherein
the first alpha-interval overall number N1 and all multiples thereof are unequal to the second alpha-interval overall number N2 and all multiples thereof for the purposes of compensating the main lines of the error spectra, and/or
secondary lines of the error spectra likewise compensate one another, wherein the error spectra of the two sensor rings are orthogonal to one another, and/or
the signal evaluation is implemented in such a way that high-harmonic error components are compensatable.

12. The rotary encoder according to claim 8, wherein:
the first disk and the second disk, for the first and/or second sensor ring, have transmission electrodes for transmitting the coupling signals between the first and the second disk, wherein
each disk has at least one transmission electrode per type of the second coupling electrodes for each sensor ring,
each transmission electrode of the first or second disk is connected in an electrically conductive manner to at least one first or second coupling electrode and
transmission electrodes of the first disk are capacitively coupled to transmission electrodes of the second disk of the same type and of the same sensor ring,
wherein
ring-shaped transmission electrodes, which extend over an angular range of 360°, have an electrically insulating break for avoiding electrical ring currents and/or
the radial extent of mutually coupling transmission electrodes of the first and the second disk differ from one another for robustness in relation to eccentricities.

13. The rotary encoder according to claim 8, wherein:
for combining the coupling signals sector-by-sector, the coupling signals are combined sector-by-sector by means of the transmission electrodes by virtue of the first disk respectively having one transmission electrode per type of the second coupling electrodes per sector and sensor ring, wherein each transmission electrode of a sensor ring of the second disk is connected in an electrically conductive manner to sequences of circularly adjacent second coupling electrodes of the same type, wherein, specifically, the circular extent of such a sequence corresponds to the circular extent of a first or second P-interval.

14. The rotary encoder according to claim 8, wherein:
the rotary encoder for at least one sensor ring has at least a first and a second signal transducer for differential signal evaluation, which signal transducers are respectively connected directly or indirectly to the first or second coupling electrodes of at least one sector and of one type, wherein, by means of switches, the connection of the second coupling electrodes is interchangeable from the first to the second signal transducer, or vice versa, in a sector-by-sector and type-by-type manner.

15. The rotary encoder according to claim 8, wherein:
for the purposes of robustness in relation to eccentricities of the first and/or second disk, the radial extent of the first coupling electrodes differs from the radial extent of the second coupling electrodes coupling therewith, the radial extent of the second coupling electrodes is greater than that of the first coupling electrodes,
and/or the first and/or second coupling electrodes are surrounded by at least one electrically shielding protective electrode,
and/or the first and/or second coupling electrodes are formed in such a way that a rotation of the first disk in relation to the second disk generates a sinusoidal profile of the capacitive coupling, and directly adjacent first coupling electrodes
are aligned in an opposite radial manner and
formed in such a different way that the different radial locations of directly adjacent first coupling electrodes caused by the opposite alignment are compensated for.

16. A method for determining angles for a rotary encoder, comprising:
actuating the first coupling electrodes or second coupling electrodes with time-varying coupling signals,
differential signal evaluating the coupling signals transmitted between the first and second coupling electrodes,
absolute determining of the angle by virtue of ambiguities, which emerge from the differential signal evaluation of coupling signals of an individual sensor ring, and
resolving with a rotary encoder by the differential signal evaluation of the coupling signals of both the first sensor ring and the second sensor ring as a result of the first alpha-interval overall number and the second alpha-interval overall number being co-prime.

17. The method according to claim 16, wherein:
the signal evaluation is brought about in such a way that, on the basis of coupling signals from the first sensor ring, weak points in portions of the error spectrum of the second sensor ring and/or, on the basis of coupling signals from the second sensor ring, weak points in portions of the error spectrum of the first sensor ring, in relatively high-frequency and/or high-frequency portions, are compensated for, wherein signal amplitudes are considered during the signal evaluation, as a result of which deviations of the forms or locations of the first and/or second coupling electrodes on the disks from ideal forms or ideal locations are compensated for.

18. The method according to claim 16, comprising:
an actuation of the first or second coupling electrodes with time-varying coupling signals,
a differential signal evaluation of coupling signals,
an absolute determination of the angle on the basis of the coupling signals from both sensor rings transmitted between the first and second coupling electrodes,
a compensation of errors by a comparative evaluation of coupling signals from different sectors and/or
a determination of the deviation of the arrangement of the first and/or second disk from an ideal location relative to the measuring axis.

19. The method according to claim 16, wherein:
by means of time multiplexing,
the actuation of the first or second coupling electrodes of a respective sensor ring with time-varying coupling signals is brought about with a mutual time offset for different coupling signal phases, and/or
the actuation of the first or second coupling electrodes with time-varying coupling signals from the first sensor ring is brought about with a time offset from the actuation of the first or second coupling electrodes with time-varying coupling signals from the second sensor ring.

20. The method according to claim 16, wherein:
each sector is read out separately by virtue of
the combined coupling signals from the second coupling electrodes of each sector being applied to separate signal transducers, or
the combined coupling signals from the second coupling electrodes of different sectors being applied with a time offset by means of time multiplexing to a common signal transducer,
wherein the combination of coupling signals by means of switches is brought about in an interchangeable sector-by-sector and type-by-type manner.

21. A non-transitory computer program product stored on a non-transitory machine-readable medium comprising program code suitable to carry out a method comprising:
actuating the first coupling electrodes or second coupling electrodes with time-varying coupling signals,
differential signal evaluating the coupling signals transmitted between the first and second coupling electrodes,
absolute determining of the angle by virtue of ambiguities, which emerge from the differential signal evaluation of coupling signals of an individual sensor ring, and
resolving with a rotary encoder by the differential signal evaluation of the coupling signals of both the first sensor ring and the second sensor ring as a result of the first alpha-interval overall number and the second alpha-interval overall number being co-prime.

* * * * *